US007813965B1

(12) United States Patent
Robinson et al.

(10) Patent No.: US 7,813,965 B1
(45) Date of Patent: Oct. 12, 2010

(54) METHOD, SYSTEM, AND COMPUTER READABLE MEDIUM FOR RANKING AND DISPLAYING A POOL OF LINKS IDENTIFIED AND AGGREGATED FROM MULTIPLE CUSTOMER REVIEWS PERTAINING TO AN ITEM IN AN ELECTRONIC CATALOG

(75) Inventors: Jim Robinson, Seattle, WA (US); Terry Nightingale, Seattle, WA (US); Scott Mongrain, Seattle, WA (US); Thomas Keller, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 330 days.

(21) Appl. No.: 11/958,133

(22) Filed: Dec. 17, 2007

Related U.S. Application Data

(60) Provisional application No. 60/984,319, filed on Oct. 31, 2007.

(51) Int. Cl.
*G06Q 30/00* (2006.01)
*G06F 17/30* (2006.01)
(52) U.S. Cl. .......................... 705/26; 705/27
(58) Field of Classification Search .............. 705/26–27
See application file for complete search history.

(56) References Cited

U.S. PATENT DOCUMENTS 7,302,429 B1 * 11/2007 Wanker ........................ 707/7
7,552,068 B1 * 6/2009 Brinkerhoff .................. 705/10
2007/0294127 A1 * 12/2007 Zivov .......................... 705/10
2008/0288481 A1 * 11/2008 Zeng et al. .................... 707/5
2009/0150832 A1 * 6/2009 Keller et al. ................. 715/854

OTHER PUBLICATIONS

Amazon http://www.amazon.com/Internet Archive (Aug. 27, 2007)—http://web.archive.org/web/20070827231639/http://www.amazon.com/.*
Amazon http://www.amazon.com/ Internet Archive (Aug. 27, 2007)—http://web.archive.org/web/20070827231639/http://www.amazon.com/.*

* cited by examiner

*Primary Examiner*—Jeffrey A Smith
*Assistant Examiner*—Kathleen Davison
(74) *Attorney, Agent, or Firm*—Lee & Hayes, PLLC

(57) ABSTRACT

Techniques described enable an entity, such as a company employing an e-commerce website, to leverage user-provided content, such as customer reviews of an item, to better customers' shopping experiences. To do so, customer reviews pertaining to an item may be examined to determine if the reviews contain links to other items. These links within the customer reviews may then be aggregated and sorted (e.g., ranked) according to certain criteria. The links may be sorted based on a number of times that the links are used in the reviews and/or on ratings of the items associated with the links. One or more of the links may then be displayed on the website. For instance, these links may appear on an item review page adjacent the customer reviews. Customers navigating to the item review page may then peruse the customer reviews as well as the displayed links that customers have used within the reviews.

25 Claims, 6 Drawing Sheets

METHOD, SYSTEM, AND COMPUTER READABLE MEDIUM FOR RANKING AND DISPLAYING A POOL OF LINKS IDENTIFIED AND AGGREGATED FROM MULTIPLE CUSTOMER REVIEWS PERTAINING TO AN ITEM IN AN ELECTRONIC CATALOG

RELATED APPLICATION

This application claims the benefit of U.S. Provisional Application No. 60/984,319 filed on Oct. 31, 2007, which is incorporated by reference herein in its entirety.

BACKGROUND

Companies utilizing e-commerce websites continually strive to make their e-commerce websites more dynamic, compelling, and easier for customers to locate, learn about, and purchase products. For instance, these companies typically allow customers to upload reviews of items sold on the website. That is, a customer who has purchased a certain item may create and upload a review of that item, whether the review is positive, negative, or neutral. These uploaded reviews may be helpful to other customers who are considering purchasing the reviewed item. In addition to providing a platform for such item reviews, these companies continue to seek ways to improve customers' online shopping and purchasing experiences.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
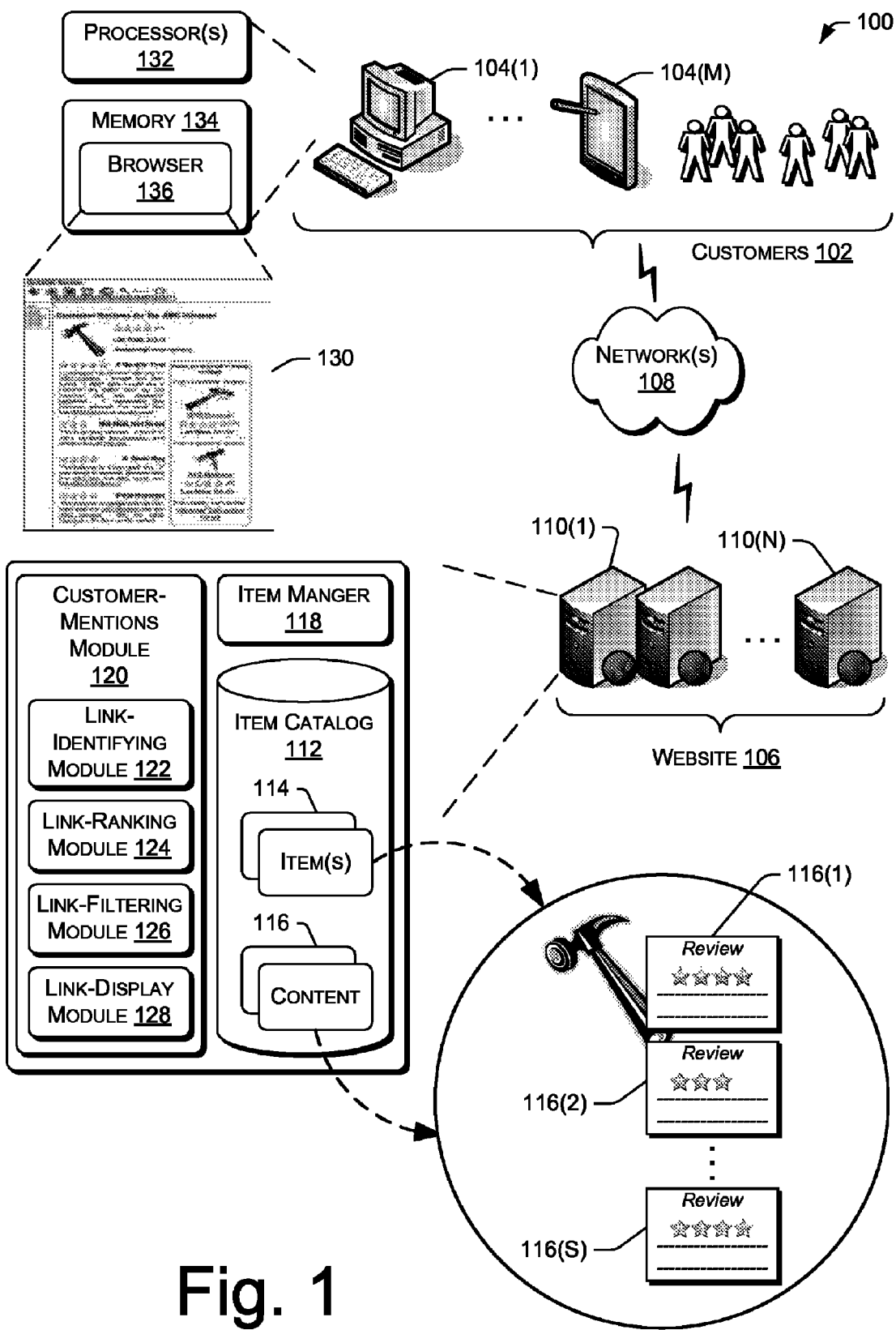
FIG. 1 is a schematic diagram of an illustrative architecture for leveraging user-provided content, such as customer reviews, in a networked environment. The networked environment includes multiple clients coupled to a server system that hosts an item catalog.

Embodiments of the present disclosure are directed to, among others, leveraging content, such as user-provided content, in a networked environment or otherwise. For instance, an entity may examine multiple pieces of content to determine if the multiple pieces of content include element identifiers. Once the entity has determined the presence of the element identifiers, the entity may sort (e.g., rank) the identifiers according to predetermined criteria. Once sorted, the entity may display or otherwise output the element identifiers in a manner based at least in part on the sorting. In some instances, the entity may display the element identifiers adjacent the multiple pieces of content from which the entity mined the element identifiers.

Element identifiers may comprise links (e.g., hyperlinks), plain text, pictures, references within a video, or any other defined component. The pieces of content, meanwhile, may include text, audio, video, animation, and/or any other type of content. For instance, the pieces of content may comprise user-uploaded reviews of an element in an electronic catalog, user-uploaded pages, and the like. The user-provided content may also comprise a user-uploaded video that displays or otherwise references (e.g., audibly) elements in the electronic catalog. An element, meanwhile, may be a product, a service, a sellable unit, a discussion forum, a blog, a website, user-created content (e.g., artwork), a media file, or anything else which may be represented by or associated with an element identifier.

In one example, a merchant such as an e-commerce merchant may mine customer-provided reviews of a particular product or products to find, within the reviews, links to other products or elements (e.g., a discussion forum). The merchant may then sort these links according to certain criteria, such as the frequency that each of the links appears in the reviews or the rating associated with the products to which links pertain. The merchant may then display or output some or all of these links to customers. For instance, the merchant may display a list or grouping of the top-rated links (according to the particular criteria established) adjacent the customer-provided reviews of the particular product to which the reviews pertain (e.g., on a product review web page associated with the particular product). By doing so, the merchant capitalizes on the associations made, by customers, between the particular product and other products or elements.

Additionally, the described techniques may be employed in multiple other environments and for multiple other purposes. For instance, pieces of content posted on a blog may be examined for links to news articles, other blogs, or the like. These links may then be sorted and displayed on the blog in a manner determined at least in part on the sorting. For instance, the links used most often in the examined content may be displayed first in an ordered list, and so on and so forth. Again, the claimed techniques may be implemented in this and in many other settings.

For purposes of discussion, however, techniques for leveraging content such as user-provided content are described in the context of an item catalog hosted by a merchant website. One illustrative implementation of this environment is provided below. However, it should be appreciated that the described techniques may be implemented in multiple other environments.

Illustrative System Architecture

FIG. 1 depicts an illustrative architecture 100 in which user-provided content may be mined and leveraged. Architecture 100 includes one or more customers 102, who may operate one or more computing devices 104(1), . . . , (M) to access a website 106 via a network 108. Network 108 represents any one or combination of multiple different types of networks, such as cable networks, the Internet, and wireless networks. Again, while FIG. 1 illustrates website 106, other architectures may employ other networked or non-networked entities and components.

One or more servers 110(1), . . . , 110(N), perhaps arranged in a cluster or as a server farm, host website 106. Other server architectures may also be used to host the site. In the illustrated implementation, meanwhile, web servers 110(1)-(N) are shown to include multiple modules and components, which may run as software on the web servers themselves. The illustrated modules may be stored in memory (e.g., volatile and/or nonvolatile memory, removable and/or non-removable media, and the like), which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. While FIG. 1 illustrates servers 110(1)-(N) as containing the illustrated modules, these modules and their corresponding functionality may be spread amongst multiple other actors, each of whom may or may not be related to website 106.

Website 106 is capable of handling requests from many users and serving, in response, various web pages that can be rendered at computing devices 104(1)-(M). Website 106 can be any type of website that supports user interaction, including online retailers, informational sites, social networking sites, blog sites, search engine sites, news and entertainment sites, and so forth.

In the illustrative environment, website 106 represents a merchant website that hosts an electronic catalog with one or more items. An item includes anything that the merchant wishes to offer for purchase, rental, licensing, subscription, viewing, informative purposes, or some other form of consumption. In some embodiments, the item may be offered by the merchant for consumption. However, in some other embodiments, the merchant may host items that others are selling using the merchant's website. An item can include a product, a service, a discussion forum, a digital download, a news clip, user-created content, information, or some other type of sellable or non-sellable unit.

In FIG. 1, the electronic catalog is represented as an item catalog 112, which stores a collection of item records 114. Item catalog 112 is accessible, directly or indirectly, by one or more of servers 110(1)-(N). Some or all of item records 114, meanwhile, represent an associated item being offered for sale or another form of consumption on website 106 and contains information about the associated item. For products such as books or music CDs, for example, the item record may contain a description, images of the product, author/artist names, publication data, pricing, shipping information, and so forth. For other types of items, the item record may contain different information appropriate for those items. Hereafter, the term "item" may be used interchangeably with the term "item record".

FIG. 1 also depicts that servers 110(1)-(N) include, or have access to, an item manager 118, which facilitates access to and management of item records 114 in item catalog 112. Item manager 112 allows website operators to add or remove items to item catalog 112.

When a user requests information about an item from website 106, one or more of servers 110(1)-(N) retrieve the item information from item catalog 112 and serve a web page containing the information to the requesting user computing device. Item catalog 112 may therefore contain static web pages that are pre-generated and stored prior to such requests, or may alternatively store data that is used to populate dynamic web pages that are generated in response to such requests.

Item catalog 112 may further include one or more pieces of content 116, which may be content provided in whole or in part by customers 102. For instance, content 116 may include customer reviews of an item within item catalog 112. FIG. 1 depicts an illustrative item 114 as a hammer, with the hammer being associated with multiple customer reviews 116(1), (2), . . . , (S). Website 106 may enable customers 102 to upload or otherwise provide customer reviews of items within item catalog 112 (and/or items within another item catalog hosted by another site). As such, one or more of customers 102 may have previously provided each of customer reviews 116(1)-(S).

In addition to providing customers 102 with a platform to create and/or upload these reviews, website 106 may also provide a tool for customers 102 to insert links into these reviews. These links may correspond to one or more of items 114 within item catalog 112. For instance, some of the links may be hyperlinks to item detail pages associated with (or other pages associated with) items within item catalog 112. Some of these links may also be hyperlinks to discussion forums or the like hosted by website 106, or by some other site. Some or all of customer reviews 116(1)-(S) may therefore include links to other items (e.g., other hammers, tools, or any other items), discussion forums (e.g., a discussion forum on a particular hammer, tools generally, or the like), websites, and/or any other type of link.

In some instances, website 106 allows users to insert links by surrounding a Uniform Resource Locator (URL) with double brackets on either side of the text (e.g., "[[text]]"). Website 106 may alternatively or additionally provide a graphical user interface (GUI) to insert links into customer reviews 116(1)-(S). When website 106 exposes a GUI to an end-user such as a customer 102, server-side logic employed by the website may view the link in the same manner as if the link had been manually typed. That is, the server-side logic on website 106 may read the link as "[[text]]", even though the link may merely appear to customer 102 as "text". Of course, while one example has been given, website 106 may allow customers 102 to insert links in many other ways.

With this in mind, FIG. 1 further illustrates that servers 110(1)-(N) include, or have access to, a customer-mentions module 120. Customer-mentions module 120 analyzes and leverages content provided by customers 102 to improve customer experiences on website 106. For instance, customer-mentions module 120 may extract certain data from customer reviews 116(1)-(S) in order to improve a shopping experience of a future customer, as described in detail below and illustrated by FIG. 2. This data may include links (e.g., hyperlinks), plain text, pictures, or any other defined category of data. While the illustrated example is described with reference to links, other examples may similarly employ multiple other types.

As illustrated, customer-mentions module 120 includes a link-identifying module 122, a link-ranking module 124, a link-filtering module 126, and a link-display module 128. Link-identifying module 122 functions to identify links within one or more pieces of customer-provided content, such as customer reviews 116(1)-(S). For instance, link-identifying module 122 may parse a corpus of text associated with customer reviews 116(1)-(S) to identify the presence of any links within the reviews. In instances where links appear within a set of double brackets ("[[text]]") as discussed above, module 122 parses the corpus of text in search of one or more sets of double brackets. Responsive to finding such a set of brackets, module 122 stores the text within the bracket as a link. Link-identifying module 122 aggregates each link found within customer reviews 116(1)-(S) for analysis by link-ranking module 124.

Link-ranking module 124 functions to receive the aggregated links from the link-identifying module 122 and rank the links according to predetermined criteria. In other instances, link-ranking module may instead sort the links in a manner other than ranking. For instance, this criteria may include a number of times that each link appears within reviews 116 (1)-(S) and/or a rating of an item associated with each link (e.g., a customer or critic rating). Other criteria may include a reputation of a customer who authored the review (e.g., a customer's reputation score on website 106), a conversion rate for a link or a page associated with the link (i.e., a percentage of customers who purchase an item after visiting a corresponding link), an availability of an item associated with a link, a profitability of an item associated with a link, a helpfulness of a review in which the link appears, an order in which links appear in a review, a similarity score or tag agreement between the item being reviewed and an item associated with a link, and/or any other factors that may be helpful in sorting the links. Link-ranking module 124 may also rank the aggregated links in a random fashion in some instances. Additionally, link-ranking module 124 may employ a certain set of criteria based upon an item being reviewed, or based upon some other factor or factors. For instance, the certain set of criteria employed may depend upon a product category associated with the reviewed item.

In one embodiment, link-ranking module 124 ranks links according to a number of times that each link appears within customer reviews 116(1)-(S) and a rating of an item associated with each link. Here, module 124 would deem a link appearing a most number of times and having a highest rating as the highest-ranking link. Conversely, module 124 would deem a link appearing the fewest number of times and having the lowest rating as the lowest-ranking link.

Once link-ranking module 124 has ranked each of the links, link-filtering module 126 may receive the ranked links and may filter out a portion of the links according to certain criteria. For instance, link-filtering module 126 may filter out links corresponding to items in item catalog 112 that the viewing customer has already purchased. Here, the customer may have identified his or herself by signing in to his or her account on website 106. Module 126 may use this information to determine which of items 114 the customer has previously purchased, and may filter out some or all of the links corresponding to these items.

Link-filtering module 126 may also filter links according to other criteria. This criteria may include, for instance, whether an item associated with a link is available in inventory or whether a link corresponds to an item that is very similar to the item being reviewed or very similar to items corresponding to other links having also been sorted. For instance, link-filtering module 126 may filter out one of two links that correspond to item detail pages of a same make of MP3 player with differing colors. That is, if the sorted links include a link to a page associated with a yellow MP3 player and a link to a page associated with the same MP3 player in green, then module 126 may filter out one of these semi-duplicative links. Of course, in some embodiments it may be advantageous to display both links and, hence, module 126 may not filter either link. Additionally, in some embodiments, customer-mentions module 120 may not employ link-filtering module 126 at all.

Once the links within the content (e.g., customer reviews 116(1)-(S)) have been aggregated, sorted, and possibly filtered, link-display module 128 receives the links to display some portion thereof to the user. Link-display module 128 may thus include some policy specifying a number of the sorted links to display, such as the five top-ranking links. Link-display module 128 may therefore cause these links to be rendered at computing device 104(1) operated by one of customers 102. Of course, while the instant example describes displaying these links, other embodiments may output this information in other suitable manners (e.g., audibly, with use of video or animations, and the like).

In instances where the user-provided content comprises customer reviews 116(1)-(S), link-display module 128 may display these links on a same page as the reviews. For instance, if one of customers 102 navigates to a review page 130 associated with the illustrated hammer, this page may include, and this customer may accordingly see, customer reviews 116(1)-(S) in a first area of the page and some or all of the links contained therein in a second area. While FIG. 1 illustrates a representation of such a review page in the form of page 130, details associated with an illustrative review page are illustrated by and described with reference to FIG. 2. Additionally, link-display module 128 may display these links on other pages, such as item detail pages, or the like.

To access page 130, as well as other web pages that website 106 hosts, customers 102 utilize computing devices 104(1)-(M) (also referred to as "client computers" or simply "clients"). While FIG. 1 illustrates computing devices 104(1) and 104(M) as a PC and a personal digital assistant (PDA), respectively, these computing devices may be implemented as any number of other types of computing devices. These devices may include, for instance, PCs, laptop computers, PDAs, mobile phones, set-top boxes, game consoles, and so forth. As illustrated, computing devices 104(1)-(M) are each equipped with one or more processors 132 and memory 134 to store applications and data.

According to some embodiments, a browser application 136 is stored in memory 134 and executes on one or more of processors 132 to provide access to website 106. For example, customers 102 may employ browser 136 to access website 106 by submitting a request, such as in the form of a uniform resource locator (URL), to servers 110(1)-(N). Upon receiving the request, servers 110(1)-(N) return a page, such as page 130, back to the requesting client computer in the illustrated implementation. Browser 136 then renders pages served by website 106 on an associated display. In addition to a user navigating via browser 136, other software applications (browsers or otherwise) could likewise operate to receive and present page 130. Note also that while the above embodiments are described in the context of a web-based system, other types of client/server-based communications and associated application logic could be used.

Illustrative Customer-Mentions Pages

Figure 2:
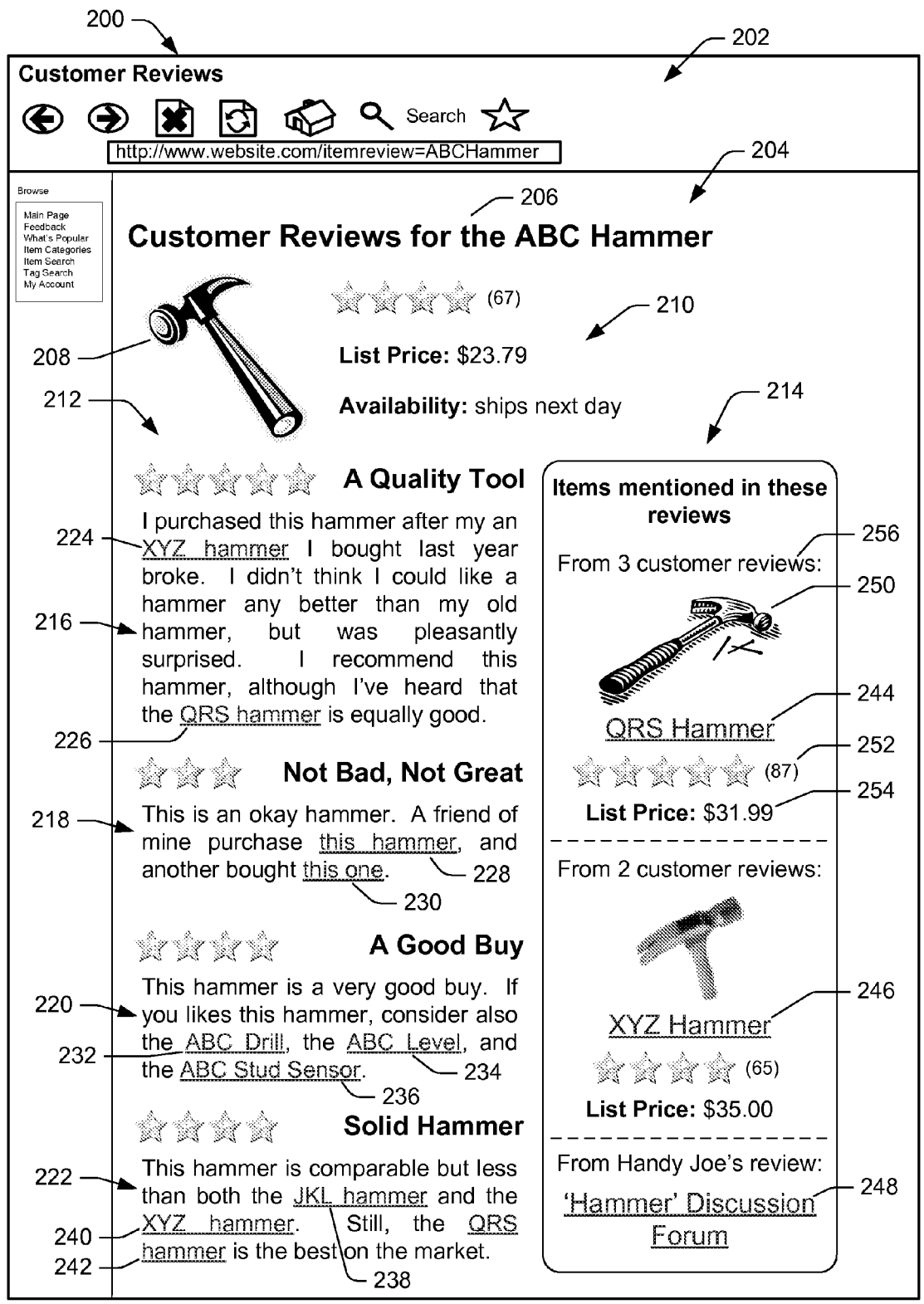
FIG. 2 is a screen rendering of an illustrative item review page. Here, the item review page includes customer reviews of a particular item (a hammer), as well as a list of other items mentioned in the customer reviews.

With an example architecture 100 in mind, FIG. 2 depicts an illustrative item review page 200 in which aggregated and sorted links may be displayed to one or more of customers 102. Here, page 200 pertains to customer reviews for a particular hammer offered for sale in item catalog 112. While FIG. 2 illustrates an item review page, other embodiments may employ multiple other types of pages, such as item detail pages, search results pages, customer discussion pages, and the like.

Page 200 includes a browser toolbar 202 and a content area 204. Browser toolbar 202 enables a user of website 106 to navigate to a page such as item review page 200. Content area 204, meanwhile, includes a title 206, an illustration 208, and item details 210. Title 206 entitles page 200 as "Customer Reviews for the ABC Hammer", while illustration 208 comprises an image of this hammer. Item details 210 include a rating, a price, and an availability of the illustrated hammer. While a few illustrative item details have been illustrated, other pages may employ more or fewer details than page 200.

Content area 204 further includes an item-review area 212 and a customer-mentions area 214. Item-review area 212 includes multiple item reviews 216, 218, 220, and 222, each pertaining to the illustrated ABC hammer. Customer-mentions area 214, meanwhile, displays data mined from within the item reviews. While the illustrated example displays links, other embodiments may display or output other data, such as pictures or the like.

As discussed above, website 106 may provide customers 102 with a platform to provide reviews of items 114 in item catalog 112. Also as discussed above, website 106 may also enable customers 102 to insert links within these reviews. In some instances, these links pertain to items in item catalog 112. For instance, an inserted link may be a hyperlink that points to an item detail page or other page associated with a particular item. Additionally, each review may include a rating (e.g., five stars) as well as a title ("A Quality Tool"). While not illustrated, these reviews may further include a name of a customer who authored the review, as well as other additional information present in traditional customer reviews.

With this in mind, customer review 216 includes a link 224 entitled "XYZ hammer" and a link 226 entitled "QRS hammer". Here, the author of customer review 216 likely inserted these links into the review, as enabled by web site 106. Additionally, link 224 likely points to a page associated with the XYZ hammer (e.g., an item detail page for this hammer), while link 226 likely points to a page associated with the QRS hammer. Therefore, if a customer who is currently viewing page 200 selects link 224, website 106 would render the page to which the link points, such as the item detail page for the XYZ hammer.

Next, customer review 218 includes a link 228 entitled "this hammer" and a link 230 entitled "this one". Here, the author of review 218 has likely altered the displayed title of these links, which again likely lead to pages associated with hammers other than the ABC hammer. Customer review 220 similarly includes links 232 ("ABC Drill"), 234 ("ABC Level"), and 236 ("ABC Stud Sensor"). Finally, review 22 includes links 238 ("JKL hammer"), 240 ("XYZ hammer") and 242 ("QRS hammer").

As described above, link-identifying module 122 may parse each of reviews 216-222 (as well as any other reviews or other content pertaining to the ABC hammer) to identify links 224-242 within the reviews. Link-ranking module 124 may then rank these identified links according to predetermined criteria, as discussed above. Link-filtering module 126 may then filter links according to predetermined criteria. Here, for example, module 126 may determine that a user who is viewing page 200 has previously purchased the ABC stud sensor, and may accordingly filter out this link, such that the link is not displayed in customer-mentions area 214. Finally, link-display module 128 may display some or all of the aggregated, sorted, and/or filtered links in customer-mentions area 214.

As illustrated, customer-mentions area 214 is entitled "[i]tems mentioned in these reviews". Area 214 also includes a link 244 entitled "QRS Hammer", a link 246 entitled "XYZ Hammer", and a link 248 entitled "Hammer Discussion Forum". Link 244 may point to a same page as links 226 and 242 (both entitled "QRS hammer"). Again, this page may comprise an item detail page for the QRS hammer, another page associated with the QRS hammer, or some other page. Link 246 may similarly point to an item detail page or other page associated with XYZ hammer, while link 248 points to a discussion forum concerning the item category "hammers". While area 214 illustrates a few exemplary links, other embodiments may include more or less links pointing to the same or different pages, such as item discussion pages, search results pages, pages hosted by another website, or any other type of webpage.

In addition to illustrating links found with customer reviews 216-222, customer-mentions area 214 may also include other details or information, which may correspond or associate with items to which links 244-248 pertain. For instance, area 214 here includes an illustration 250, a rating 252 (e.g., an average customer rating, a critic-provided rating, or the like), and a price 254 of the QRS hammer. Area 214 also includes an indication 256 of a number of customer reviews in which link 244 appears (here, three). As illustrated, customer-mentions area 214 may similarly include this information for links 246 and 248. Other embodiments may include more or less information than illustrated customer-mentions area 214.

By mining, sorting, and displaying some or all of links 244-248, website 106 leverages information provided by customers 102, who may have first hand knowledge regarding an item such as the ABC Hammer. Therefore, when a potential buyer navigates to a page, such as item review page 200, the potential buyer may not only see item reviews for the ABC Hammer, but may also view links to other items (e.g., products, forums, etc.) that may also benefit the customer. As such, website 106 may improve a shopping experience of customers generally. As discussed above, other environments (e.g., blogs, news sites, etc.) and architectures may similarly employ these tools to better other types of experiences.

Illustrative Customer-Mentions Processes

Figure 3:
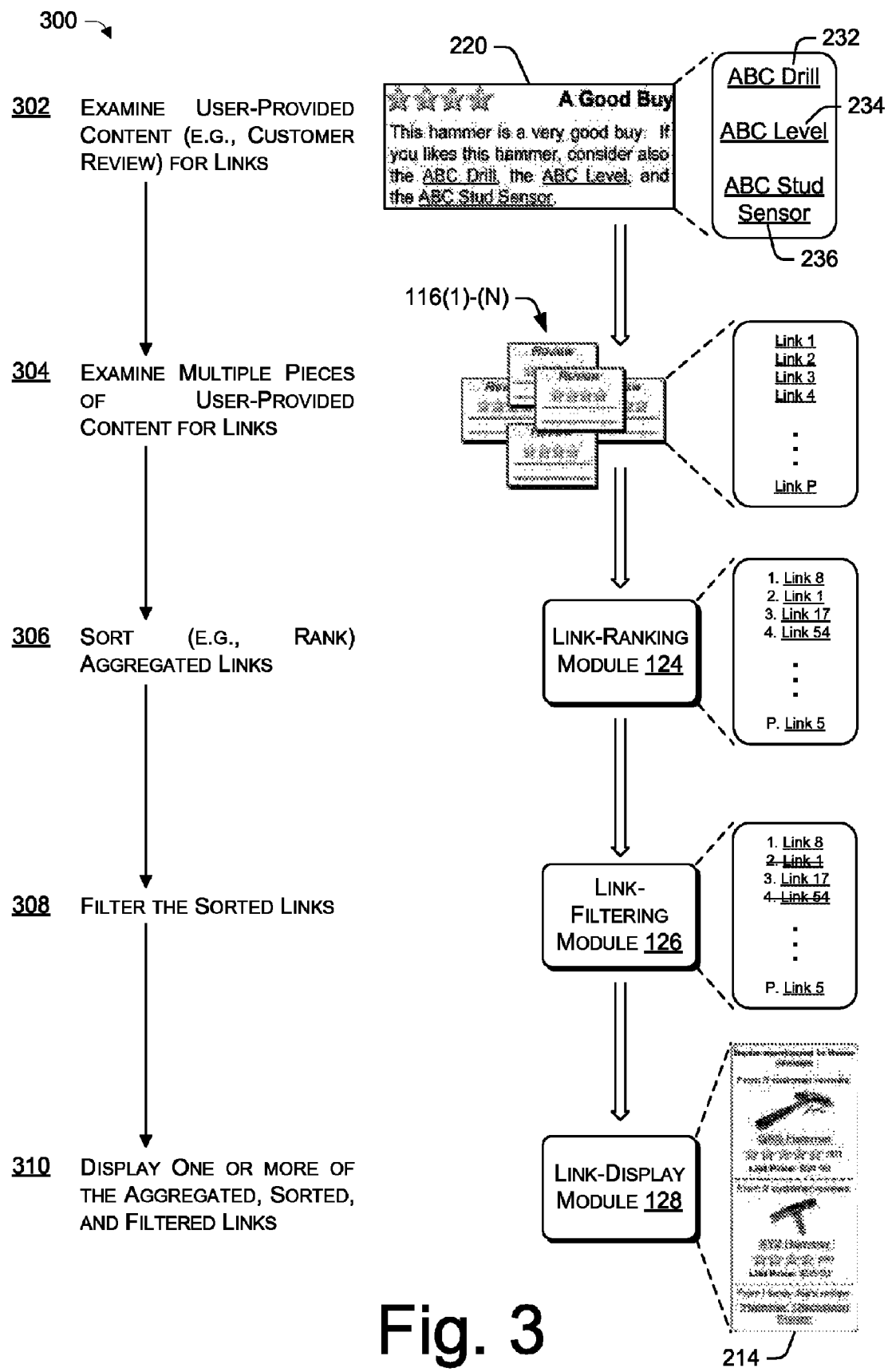
FIG. 3 is a functional flow diagram of an illustrative process for aggregating, sorting, filtering, and displaying links within user-provided content, such as customer reviews.

FIG. 3 depicts a functional flow diagram of an illustrative process 300 for aggregating, sorting, filtering, and displaying element identifiers, such as links, present in user-provided content, such as customer reviews. Each operation with this figure can be implemented in hardware, software, or a combination thereof.

Process 300 includes operation 302, which examines user-provided content for links or some other element identifiers, such as pictures, a certain string of plain text, or the like. As illustrated adjacent operation 302, a piece of content, such as customer review 220, may be examined to identify links 232, 234, and 236 within the review. As described above, link-filtering module 122 may examine the review.

Next, operation 304 represents that in addition to examination of a single review, multiple other pieces of content may be examined. Adjacent operation 304 is a representation of multiple customer reviews 116(1)-(S) being examined to aggregate links 1-P. Operation 306 then represents link-ranking module 124 ranking some or all of the aggregated links 1-P. Operation 308 further illustrates that link-filtering module 126 may filter out a portion of the aggregated links. In the illustrated example, link-filtering module 126 has filtered out at least the second- and fourth-ranked links.

Finally, operation 310 represents displaying one or more of the aggregated, ranked, and filtered links. Adjacent operation 310 is an illustration representing that link-display module 128 may display customer-mentions area 214 from FIG. 2. As such, link-display module 128 may display the top-three ranked links. In other embodiments, more or fewer links may be displayed, either according to each link's respective ranking, or even randomly.

Operation

Figure 4:
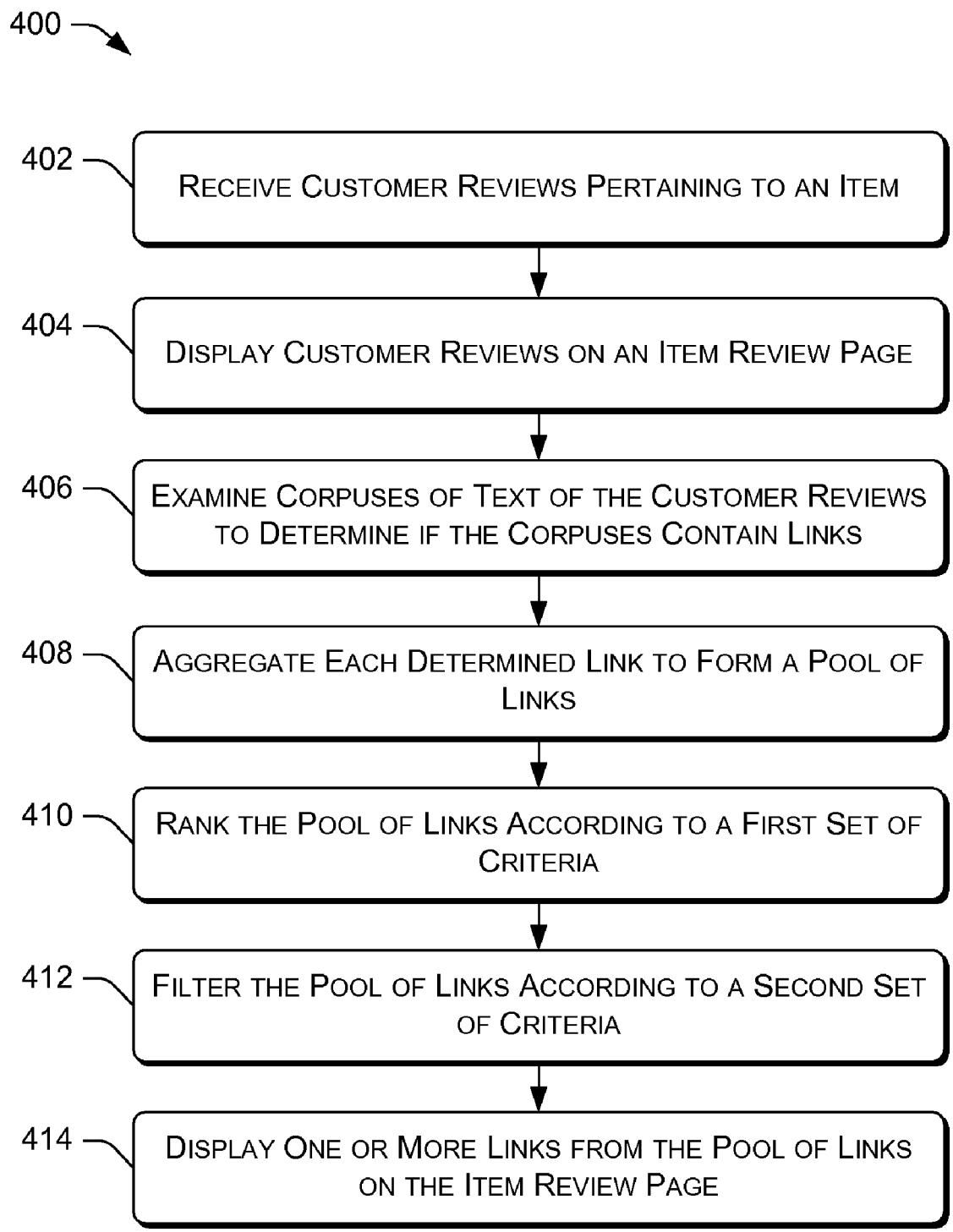
FIGS. 4-6 are flow diagrams of illustrative processes of examining and leveraging user-provided content.
Figure 5:
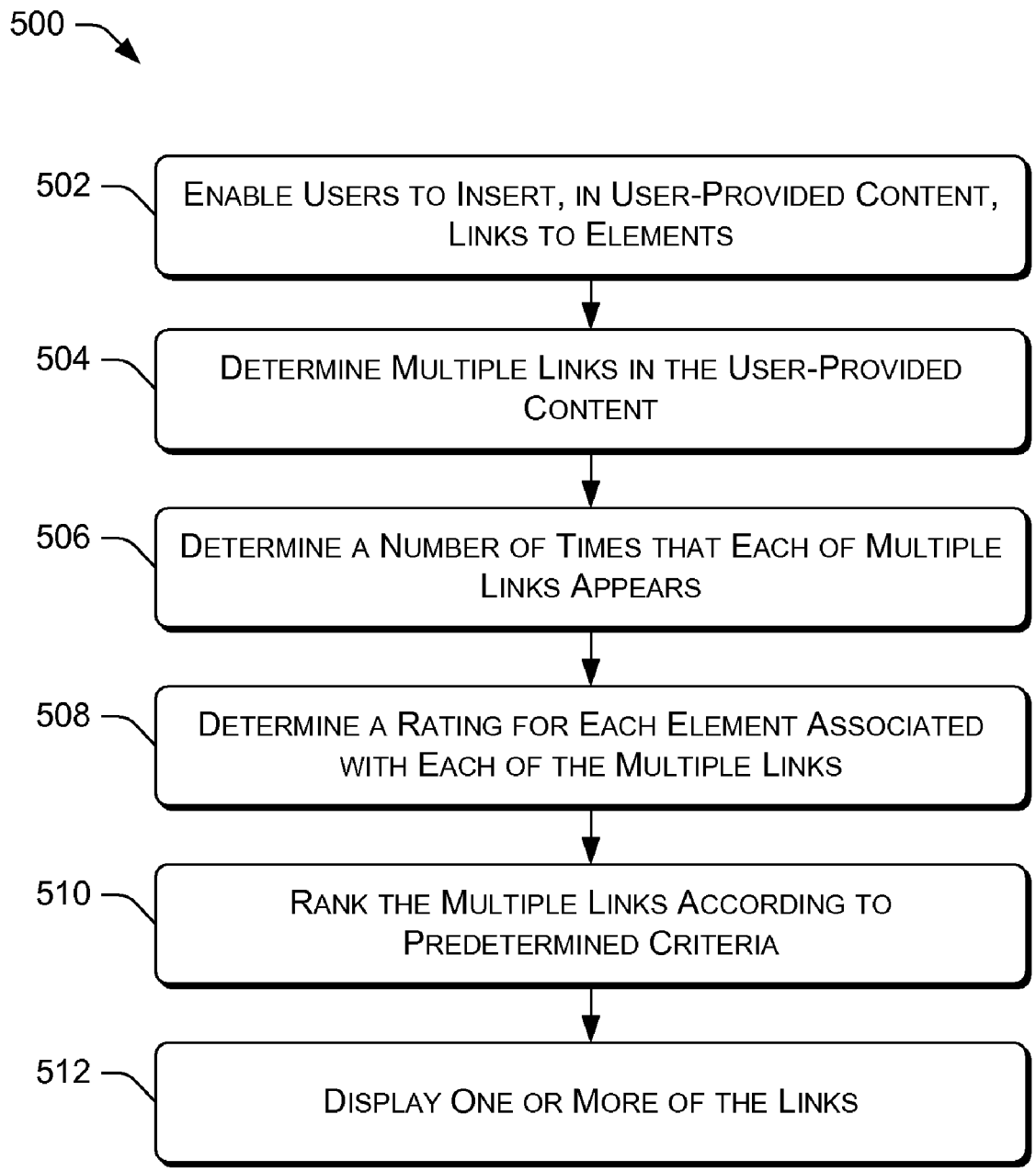
Figure 6:
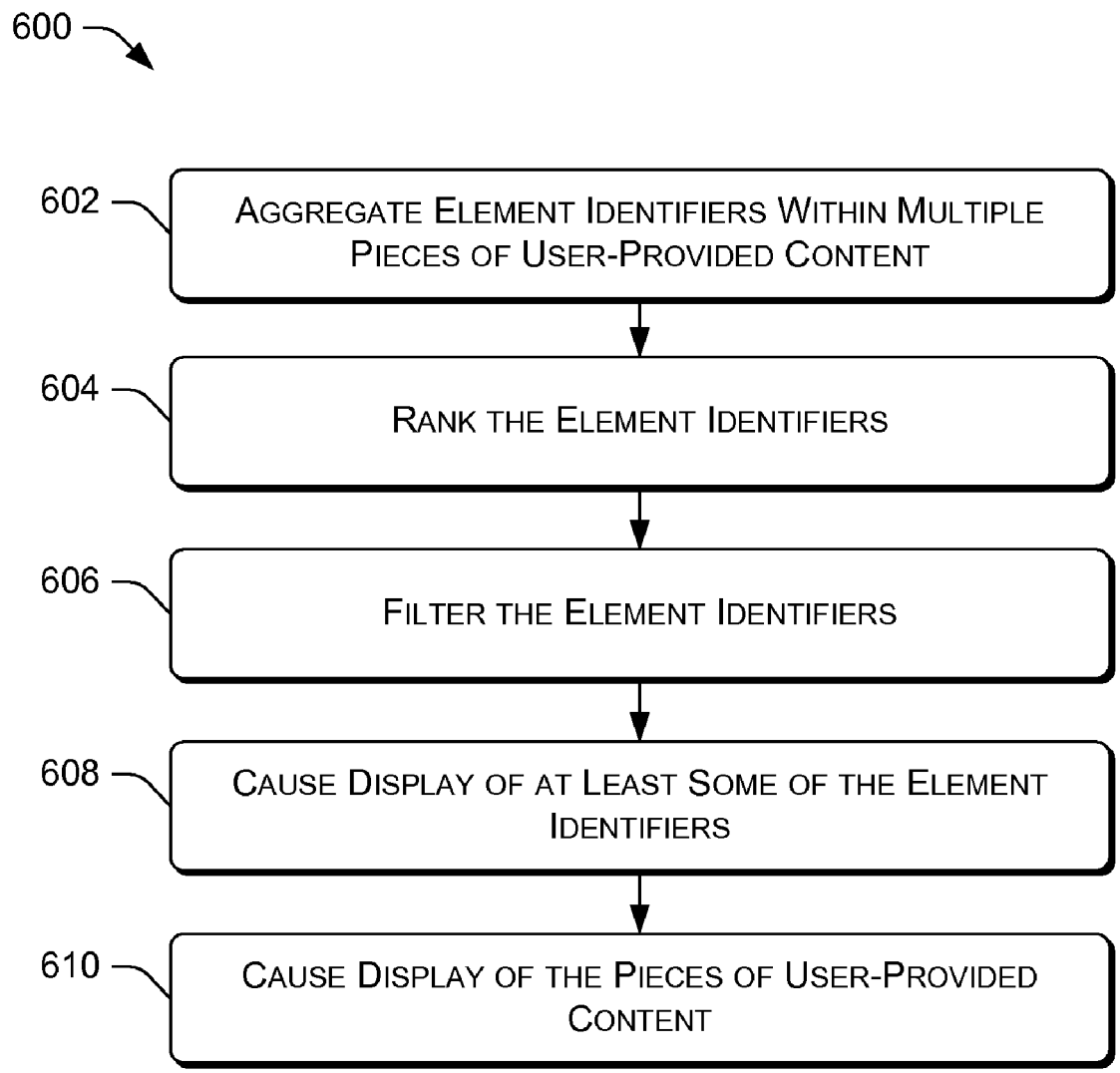

FIGS. 4-6 depict additional illustrative processes 400-600 for implementing the techniques discussed above and claimed below. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 400 includes operation 402, which represents receiving customer reviews pertaining to an item. Some or all of these customer reviews may include a corpus of text. Operation 404 then displays at least some of the customer reviews on an item review page corresponding to the item being reviewed. Next, operation 406 examines the corpuses of text of the customer reviews to determine if these corpuses contain links, such as links to other items in item catalog, discussion forums, or other types of links. Operation 406 may also determine these links in other ways. For instance, the links may be stored in a database or a file, which may be accessed to determine the links. Operation 408 then aggregates each determined link to form a pool of links.

This pool of links is then ranked, at operation 410, according to a first set of criteria. For instance, these criteria may include a rating of an item associated with a respective link or a number of times that a respective link appears within the corpuses of text. Operation 412 then filters links from the pool of links according to a second set of criteria. These criteria may include whether or not a particular user has previously purchased an item associated with a respective link. Finally, operation 414 displays, on the item review page, one or more of the links from the pool of links.

FIG. 5 illustrates process 500, which includes operation 502, which enables users to insert links within user-provided content. Operation 504 then determines multiple links in the user-provided content. These links may be determined by examining (e.g., parsing) the content or by accessing or otherwise receiving information from a database or file that contains an indication of these links. In some instances, these links correspond to elements in an electronic catalog, such as items for sale or consumption, discussion forums, and the like. Next, operation 506 determines a number of times that each of the multiple links appears in the user-provided content, while operation 508 determines a rating for each element associated with each of the links.

Operation 510 then ranks the multiple links according to predetermined criteria, which may include the number of times that each of the links appear in the user-provided content and/or a rating for the elements associated with the links. Operation 512 then displays one or more of the links at least in part according to the ranking.

Finally, FIG. 6 depicts illustrative process 600, which includes operation 602. This operation aggregates element identifiers (e.g., links, text, pictures, etc.) within multiple pieces of user-provided content. Operation 604 then ranks the aggregated element identifiers. This may be based at least in part on a number of times that a respective element identifier appears within the multiple pieces of user-provided content and/or on a rating of an element associated with a respective element identifier. This may also be based on a helpfulness rating (e.g. as voted on by customers 102) of a piece of content in which the respective link appears. For instance, an element identifier within a "very helpful" or highly rated piece of content may be ranked higher than an element identifier within a less helpful or lower rated piece of content. This ranking may also be based at least in part on a time at which a respective piece of content was provided. For instance, if a first piece of content such as an item review was uploaded to a website more recently than a second piece of content, then element identifiers within the first piece of content may be ranked higher than element identifiers within the second piece (at least according to that factor). The ranking may also be based on multiple other factors, either singly or in combination, such as a reputation of the user who provided a piece of content, a sales rank or other rating of an element associated with an element identifier, and so forth.

Next, operation 606 filters the element identifiers, after which operation 608 causes display of at least some of the aggregated and sorted element identifiers. Finally, operation 610 causes display of at least some of the multiple pieces of user-provided content, possibly on a same page as the displayed element identifiers. For instance, process 600 may display both element identifiers as well as user-provided content on an element review page associated with a certain element.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
under control of one or more computer systems configured with executable instructions,
receiving multiple customer reviews pertaining to an item in an electronic catalog, each of the multiple customer reviews comprising a corpus of text;
displaying at least some of the multiple customer reviews on an item review page corresponding to the item to which the customer reviews pertain;
determining an identity of links to items in the electronic catalog in the corpuses of text;
aggregating each determined link to form a pool of links to items in the electronic catalog;
ranking the pool of links according to a first set of predetermined criteria;
filtering the pool of links according to a second set of predetermined criteria; and
displaying, on the item review page, one or more links from the pool of links according to the ranking and the filtering of the pool of links.

2. A method as recited in claim 1, wherein the first set of predetermined criteria includes a rating of the item to which the customer reviews pertain, a number of times that a respective link is used in the corpuses of text, a reputation of a customer who authored a respective customer review in which a respective link appears, or a conversion rate for a respective link or a page associated with a respective link.

3. A method as recited in claim 1, further comprising:
determining a user to which the item review page is being displayed; and
determining, for each link in the pool of links, whether the user has previously purchased an item corresponding to the link, and wherein the second set of predetermined criteria includes whether or not the user has previously purchased items corresponding to each link of the pool of links.

4. A method comprising:
under control of one or more computer systems configured with executable instructions, determining an identity of each of multiple links in user-provided customer reviews, each of the multiple links corresponding to a respective element in an electronic catalog;

aggregating each determined link to form a pool of links to the respective elements in the electronic catalog;

ranking the pool of links according to predetermined criteria; and displaying one or more links from the pool of links at least in part according to the ranking.

5. A method as recited in claim 4, wherein the determining of each of the multiple links comprises examining the user-provided customer reviews or examining a database that includes an indication of each of the links.

6. A method as recited in claim 4, wherein at least one of the multiple links is a hyperlink that points to a detail page associated with a respective element in the electronic catalog.

7. A method as recited in claim 4, wherein at least one of the elements comprises an item for sale in the electronic catalog, and wherein the user-provided customer reviews comprise multiple reviews of the item for sale or a discussion forum.

8. A method as recited in claim 4, further comprising determining a number of times that each of the multiple links appears in the user-provided customer reviews, and wherein the predetermined criteria comprises the number of times that each of the multiple links appear in the user-provided customer reviews.

9. A method as recited in claim 4, further comprising determining a rating for each element associated with each of the multiple links, and wherein the predetermined criteria comprises the rating for each element associated with each of the multiple links.

10. A method as recited in claim 4, wherein the displaying comprises displaying a list of multiple links in an order determined by the ranking of the multiple links.

11. A method as recited in claim 4, wherein the one or more displayed links are displayed on a same page as the user-provided customer reviews.

12. A method as recited in claim 4, further comprising enabling users to insert, in the user-provided customer reviews, the links to the elements in the electronic catalog.

13. A method as recited in claim 4, further comprising displaying details of elements associated with the one or more displayed links adjacent the one or more displayed links.

14. One or more non-transitory computer-readable media storing computer-executable instructions that, when executed on one or more processors, perform acts comprising:

aggregating element identifiers located within multiple pieces of user-provided comments, each of the multiple pieces of user-provided comments comprising a corpus of text and each of the element identifiers corresponding to an element in an electronic catalog;

ranking the aggregated element identifiers according to predetermined criteria; and causing display of at least some of the aggregated element identifiers based at least in part on the ranking.

15. One or more computer-readable media as recited in claim 14, wherein the predetermined criteria includes one or more of a number of times that a respective element identifier appears within the multiple pieces of the user-provided comments, a rating of an element associated with a respective element identifier, a helpfulness rating of a piece of a user-provided comment in which an element identifier is located, or a time at which a respective piece of a user-provided comment was provided.

16. One or more computer-readable media as recited in claim 14, wherein the element identifiers comprise links to elements in an electronic catalog, pictures of elements in the electronic catalog, references of elements in the electronic catalog within a video, or plain text identifying elements in the electronic catalog.

17. One or more computer-readable media as recited in claim 14, wherein the pieces of the user-provided comments comprise user reviews of elements in an electronic catalog or user-provided posts on a discussion forum or an online blog.

18. One or more computer-readable media as recited in claim 14, further storing computer-executable instructions that, when executed on the one or more processors, perform an act comprising filtering one or more of the aggregated element identifiers such that the one or more filtered element identifiers are not displayed to a user.

19. One or more computer-readable media as recited in claim 18, wherein the filtering of the one or more aggregated element identifiers is based at least in part on whether the user has previously purchased an element associated with an element identifier or on an availability of the element.

20. One or more computer-readable media as recited in claim 14, further storing computer-executable instructions that, when executed on the one or more processors, perform an act comprising causing display of the pieces of user-provided comments on a same page as the displayed element identifiers.

21. A system comprising:
one or more processors;
a memory, accessible by the one or more processors;
a database stored in the memory and configured to store customer reviews of items in an electronic catalog;
a link-identifying module stored in the memory and executable on the one or more processors to identify links within the customer reviews stored in the database and to aggregate each identified link to form a pool of links to items in the electronic catalog; and
a link-ranking module stored in the memory and executable on the one or more processors to rank the pool of links according to predetermined criteria.

22. A system as recited in claim 21, wherein at least some of the links within the customer reviews comprise hyperlinks that point to item detail pages associated with respective items in the electronic catalog.

23. A system comprising:
one or more processors;
a memory accessible by the one or more processors;
a link identifying module stored in the memory and executable on the one or more processors to identify multiple links within multiple discrete pieces of user-provided comments and to aggregate each identified link to form a pool of links to items in an electronic catalog; and
a graphical user interface module stored in the memory and executable on the one or more processors to output a graphical user interface comprising:
a first screen area to display the multiple discrete pieces of user-provided comments that include the multiple links; and
a second screen area separate from and adjacent to the first screen area to display at least some of the pool of links within the user-provided comments, wherein the displayed links are chosen and arranged within the second screen area according to one or more criteria.

24. A system as recited in claim 23, wherein:
the user-provided comments comprise customer reviews pertaining to an item for sale in the electronic catalog;
at least some of the links within the user-provided comments point to an item detail page associated with another item for sale in the electronic catalog; and the first and second screen areas appear on an item review page associated with the item to which the customer review pertains.

25. A system as recited in claim 23, wherein:

at least some of the links within the user-provided comments pertain to elements in the electronic catalog; and the second screen area is further to display details associated with the elements in the electronic catalog to which the links pertain.

* * * * *